United States Patent
Ziemer et al.

(10) Patent No.: US 10,766,350 B2
(45) Date of Patent: Sep. 8, 2020

(54) TRANSMISSION FOR A MOTOR VEHICLE, AND DRIVE TRAIN FOR A MOTOR VEHICLE

(71) Applicant: ZF Friedrichshafen AG, Friedrichshafen (DE)

(72) Inventors: Peter Ziemer, Tettnang (DE); Michael Roske, Friedrichshafen (DE); Juri Pawlakowitsch, Kressbronn (DE); Thomas Rosemeier, Meckenbeuren (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/314,017

(22) PCT Filed: May 16, 2017

(86) PCT No.: PCT/EP2017/061724
§ 371 (c)(1),
(2) Date: Dec. 28, 2018

(87) PCT Pub. No.: WO2018/001619
PCT Pub. Date: Jan. 4, 2018

(65) Prior Publication Data
US 2019/0193550 A1    Jun. 27, 2019

(30) Foreign Application Priority Data
Jun. 30, 2016 (DE) .................. 10 2016 211 884

(51) Int. Cl.
*F16H 3/66* (2006.01)
*B60K 6/365* (2007.10)
(Continued)

(52) U.S. Cl.
CPC ............... *B60K 6/365* (2013.01); *B60K 6/48* (2013.01); *B60K 6/547* (2013.01); *F16H 3/66* (2013.01);
(Continued)

(58) Field of Classification Search
CPC .................................. B60K 6/365; B60K 6/48
See application file for complete search history.

(56) References Cited

U.S. PATENT DOCUMENTS 7,975,571 B2 * 7/2011 Sanji .................. B60K 6/40
74/661
8,328,674 B2   12/2012 Swales et al.
(Continued)

FOREIGN PATENT DOCUMENTS

DE         10333437 A1   4/2005
DE     102009018958 A1   2/2011
(Continued)

OTHER PUBLICATIONS

German Search Report DE102016211884.6, dated Feb. 23, 2017. (12 pages).
(Continued)

*Primary Examiner* — Derek D Knight
(74) *Attorney, Agent, or Firm* — Dority & Manning, P.A.

(57) ABSTRACT

A transmission for a motor vehicle having an input shaft, an output shaft, a plurality of planetary gear sets, a plurality of shift elements, and an electric machine arranged axially parallel to the input shaft and operatively connected to the input shaft with a constant transmission ratio via a spur gear drive or a flexible traction drive mechanism. Various gear steps are formable between the input shaft and the output shaft through the planetary gear sets by selectively engaging shift elements of the plurality of shift elements. An actuating element of one of the plurality of shift elements is arranged, (Continued)

at least partially, radially within an element of the spur gear drive or the flexible traction drive mechanism arranged coaxially to the input shaft, and together with the spur gear drive or the flexible traction drive mechanism in a plane orthogonal to an axis of rotation of the input shaft.

5 Claims, 3 Drawing Sheets

(51) Int. Cl.
    *B60K 6/547*    (2007.10)
    *B60K 6/48*    (2007.10)
    *F16H 57/08*    (2006.01)
    *F16H 57/04*    (2010.01)
    *F16H 3/44*    (2006.01)

(52) U.S. Cl.
    CPC ....... *F16H 57/043* (2013.01); *F16H 57/0471* (2013.01); *F16H 57/0484* (2013.01); *F16H 57/08* (2013.01); *B60K 2006/4816* (2013.01); *B60K 2006/4825* (2013.01); *B60K 2006/4833* (2013.01); *F16H 2003/442* (2013.01); *F16H 2003/445* (2013.01); *F16H 2057/087* (2013.01); *F16H 2200/0008* (2013.01); *F16H 2200/0052* (2013.01); *F16H 2200/201* (2013.01); *F16H 2200/2043* (2013.01); *F16H 2200/2097* (2013.01)

(56) References Cited

U.S. PATENT DOCUMENTS 9,080,648 B2 * 7/2015 Ziemer ..................... F16H 3/44
2014/0246935 A1    9/2014 Kesuya et al.
2015/0051043 A1    2/2015 Beck et al.

FOREIGN PATENT DOCUMENTS

| DE | 102011009015 A1 | 3/2012 |
| DE | 102012201685 A1 | 8/2013 |
| DE | 112012003406 T5 | 5/2014 |
| DE | 102014215092 A1 | 2/2016 |
| JP | 2009101729 A | 5/2009 |
| WO | WO 2005/019688 | 3/2005 |
| WO | WO 2016/016371 | 2/2016 |

OTHER PUBLICATIONS

International Search Report (English Translation) PCT/EP2017/061724 dated Jul. 14, 2017. (3 pages).

* cited by examiner

TRANSMISSION FOR A MOTOR VEHICLE, AND DRIVE TRAIN FOR A MOTOR VEHICLE

FIELD OF THE INVENTION

The invention relates generally to a transmission for a motor vehicle, and to a drive train for a motor vehicle having such a transmission. In this case, a transmission refers, in particular, to a multi-stage transmission, in which a multitude of gears, i.e., fixed translation ratios between the input shaft and the output shaft of the transmission, are preferably automatically shiftable with the aid of shift elements. In this case, the shift elements are clutches or brakes, for example. Such transmissions are utilized primarily in motor vehicles in order to adapt the rotational speed and torque output characteristic of the drive unit to the driving resistances of the vehicle in a suitable way.

BACKGROUND

Patent application DE 11 2012 003 406 T5 describes a hybrid drive device, in which an electric motor is arranged on a second axis which is parallel to a first axis. A transmission having an input shaft and a layshaft gear is arranged on the first axis. The layshaft gear is connected to driving wheels of a motor vehicle via a differential device. The electric motor is connected to the input shaft via a connecting mechanism, i.e. a spur gear drive. The gear-implementing section of the transmission is merely schematically represented.

Patent application DE 10 2009 018 958 A1 describes a multi-stage transmission having a housing, three planetary gear sets, and a first shaft, a second shaft, and a third shaft, wherein the third shaft is arranged axially offset with respect to the first shaft and the second shaft. According to the exemplary embodiment represented in FIG. 3, the multistage transmission has an electric machine which is arranged coaxially to the third shaft. The electric machine is permanently operatively connected to the second shaft via a chain or belt connection.

The two devices known from the related art are provided for use in a motor vehicle drive train which is aligned transversely to the direction of travel of the motor vehicle. These types of devices are usually to be optimized with respect to a preferably short axial installation length, since the axial assembly having a drive machine and a transmission is to be arranged between the longitudinal members of the front end of the motor vehicle.

The problem addressed by the invention is that of providing a transmission for a motor vehicle, which is distinguished by a particularly short axial installation length.

SUMMARY OF THE INVENTION

The transmission includes an input shaft, an output shaft, a plurality of planetary gear sets, a plurality of shift elements, and an electric machine arranged axially parallel to the input shaft. Through selective engagement of the shift elements, various gear steps are formable between the input shaft and the output shaft with via the planetary gear sets. The electric machine is permanently operatively connected to the input shaft by a spur gear drive or a flexible traction drive mechanism, wherein the transmission ratio between the input shaft and the electric machine is constant.

The spur gear drive can have one or several intermediate gears, the axes of rotation of which are axially parallel to the axis of rotation of the electric machine rotor and axially parallel to the axis of rotation of the input shaft. Examples of flexible traction drive mechanisms are chains, V-belts, or even toothed belts.

According to the invention, an actuating element of one of the shift elements is arranged, at least partially, radially within an element of the spur gear drive or of the flexible traction drive mechanism arranged coaxially to the input shaft. The actuating element is arranged together with the spur gear drive or the flexible traction drive mechanism in a plane arranged at a right angle with respect to the axis of rotation of the input shaft.

In other words, the actuating element of a shift element is nested, at least partially, radially within that element of the spur gear drive or of the flexible traction drive mechanism which is coaxial to the input shaft. Elements of the spur gear drive or of the flexible traction drive mechanism and the actuating element are arranged in a common plane which is oriented at a right angle with respect to the input shaft.

Due to the arrangement according to the invention, the axial installation length of the transmission is reduced, since the spur gear drive or the flexible traction drive mechanism and the actuating element are no longer successively axially arranged.

According to one preferred embodiment, the actuating element is a hydraulically operated piston. Such a piston typically has rotational symmetry and, therefore, is easily arranged, at least partially, radially within the spur gear drive element or the flexible traction drive mechanism element.

Preferably, a supply of hydraulic fluid for pressurizing the piston and a supply of hydraulic fluid for lubricating the spur gear drive or the flexible traction drive mechanism are supplied via separate ducts which are arranged, partially, within the input shaft. An antifriction bearing of the input shaft is also suppliable with lube oil via the duct for lubricating the spur gear drive or the flexible traction drive mechanism. Such a central hydraulic fluid supply originating from the input shaft also contributes to the compact design of the transmission.

Preferably, the transmission includes an interface to a transmission-external drive unit, for example, to an internal combustion engine. The interface transmits a turning motion from the transmission-external drive unit to the input shaft of the transmission and is, for example, a flange or a spline. The interface is formable on the input shaft or on a connecting shaft which is connectable to the input shaft. The interface is also formable, for example, on a hydrodynamic torque converter which is connected to the input shaft and acts as a starting component. The spur gear drive or the flexible traction drive mechanism is arranged, in this case, at an axial end of the transmission which is positioned opposite the interface to the transmission-external drive unit.

The transmission can be an integral part of a drive train for a motor vehicle. The drive train comprises, in addition to the transmission, an internal combustion engine which is torsionally elastically connected to the input shaft of the transmission via a transmission-internal or transmission-external torsional vibration damper, or is torsionally elastically connectable to the input shaft of the transmission via a separating clutch. The output shaft is operatively connected to a transmission-internal or transmission-external differential gear, wherein output shafts of the differential gear are connected to driving wheels of the motor vehicle. The transmission, including the electric machine, allows for several drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by the internal combustion engine as well as by the electric machine of the transmission.

BRIEF DESCRIPTION OF THE DRAWINGS

One exemplary embodiment of the invention is described in detail in the following with reference to the attached figures. In the figures, the following is shown.

DETAILED DESCRIPTION

Figure 1:
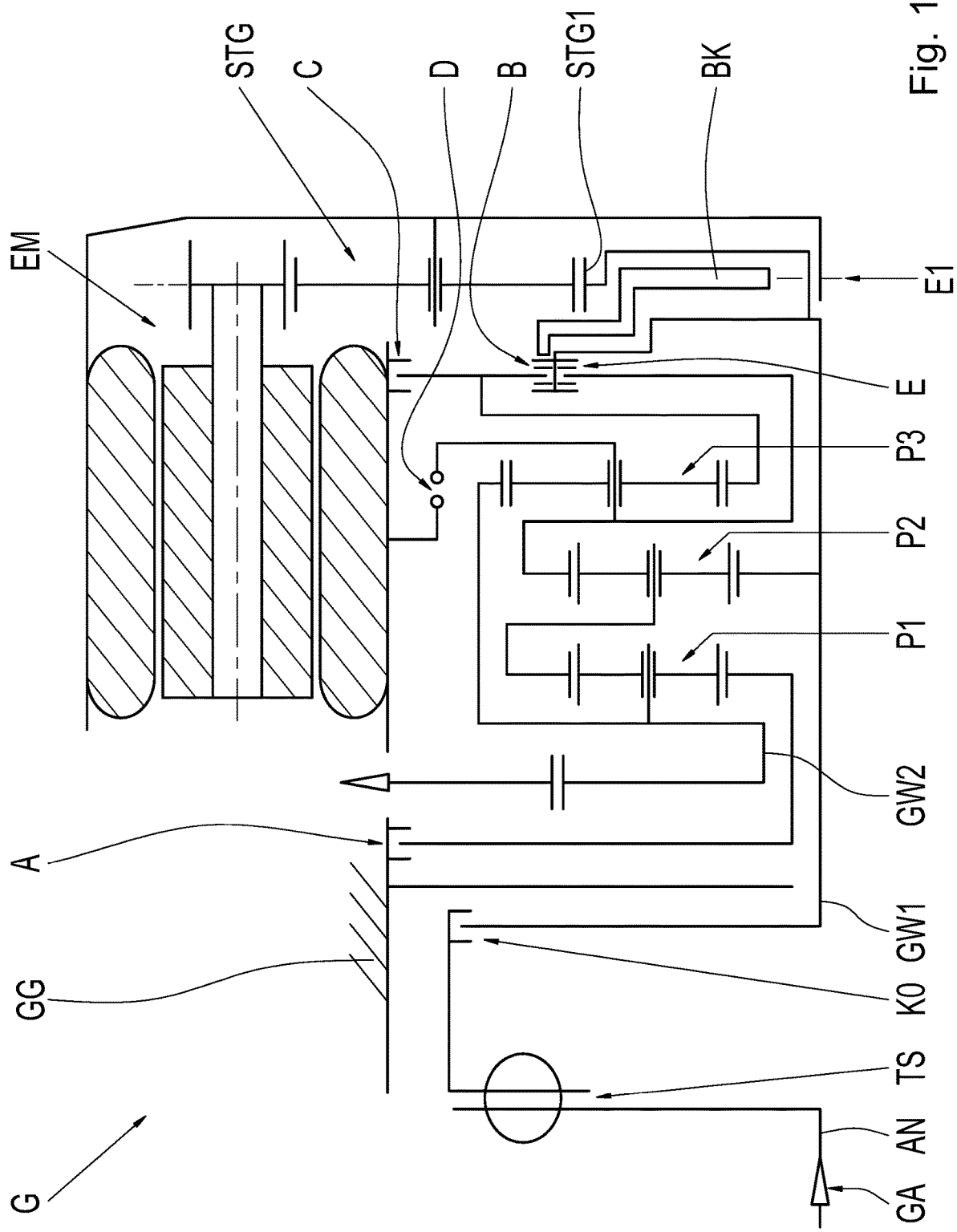
FIG. 1 shows a schematic view of a transmission in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a transmission G which comprises an input shaft GW1, an output shaft GW2, a first planetary gear set P1, a second planetary gear set P2, a third planetary gear set P3, five shift elements A, B, C, D, E, an electric machine EM, a torsional vibration damper TS, a connecting shaft AN, and a separating clutch K0.

The first, second, and third planetary gear sets P1, P2, P3 are arranged coaxially to the input shaft GW1. The output shaft GW2 is permanently connected to the carrier of the first planetary gear set P1 and to the ring gear of the third planetary gear set P3. The ring gear of the first planetary gear set P1 is permanently connected to the carrier of the second planetary gear set P2. The ring gear of the second planetary gear set P2 is permanently connected to the carrier of the third planetary gear set P3. The sun gear of the second planetary gear set P2 is permanently connected to the input shaft GW1. The sun gear of the first planetary gear set P1 is rotationally fixable with respect to a housing GG of the transmission G by engaging the first shift element A. The input shaft GW1 is connectable to the sun gear of the third planetary gear set P3 by engaging the second shift element B. By engaging the third shift element C, the sun gear of the third planetary gear set P3 is rotationally fixable to the housing GG of the transmission G. By engaging the fourth shift element D, the carrier of the third planetary gear set P3 is rotationally fixable to the housing GG of the transmission G. The input shaft GW1 is connectable to the carrier of the third planetary gear set P3 by engaging the fifth shift element E.

The first, second, third, and fifth shift elements A, B, C and E are force-locking shift elements, for example, while the fourth shift element D is a form-fit shift element, for example.

The transmission G includes an interface GA to a transmission-external drive unit which is, for example, an internal combustion engine. The interface GA is configured for transmitting a rotational speed of the transmission-external drive unit to the input shaft GW1. A torsional vibration damper TS and a separating clutch K0 are arranged between the interface GA and the input shaft GW1. By engaging the separating clutch K0, the input shaft GW1 is connectable to a connecting shaft AN, on which the interface GA is arranged.

The output shaft GW2 has, on one end, a spur gear tooth system which is utilized for the power transmission between the output shaft GW2 and a differential gear AG (not represented) arranged axially parallel to the output shaft GW2. The differential gear AG can be an integral part of the transmission G.

The electric machine EM comprises a stator, which is rotationally fixed with respect to the housing GG, and a rotary rotor, and is arranged axially parallel to the input shaft GW1. The rotor is permanently operatively connected to the input shaft GW1 via a spur gear drive STG. In the represented exemplary embodiment, the spur gear drive STG includes an intermediate gear which is rotatably mounted on the housing GG. This intermediate gear intermeshes with an element STG1 of the spur gear drive STG, which is arranged coaxially to the input shaft GW1. An actuating element BK for actuating the shift element B is arranged radially within the element STG1 in this case. Integral parts of the spur gear drive STG as well as the actuating element BK are arranged in a plane E1 which is oriented normal to or at a right angle to the input shaft axis. Alternative to the spur gear drive STG, a flexible traction drive mechanism is also usable, for example, a chain drive.

Figure 2:
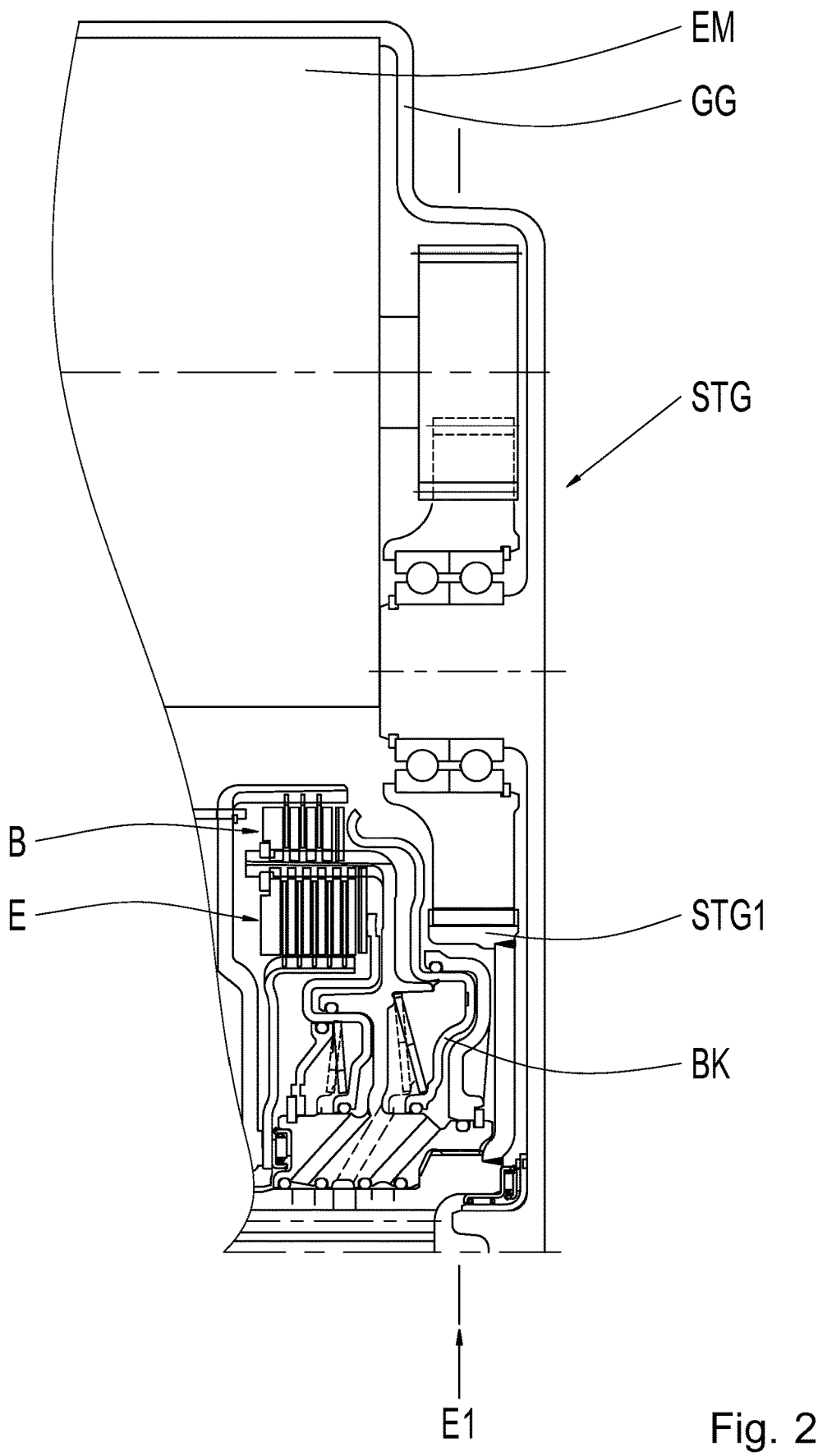
FIG. 2 shows a partial, perspective view of one area of the transmission shown in FIG. 1 in accordance with aspects of the present subject matter.

FIG. 2 shows a partial, perspective view of the transmission G according to the first exemplary embodiment represented in FIG. 1.

Figure 3:
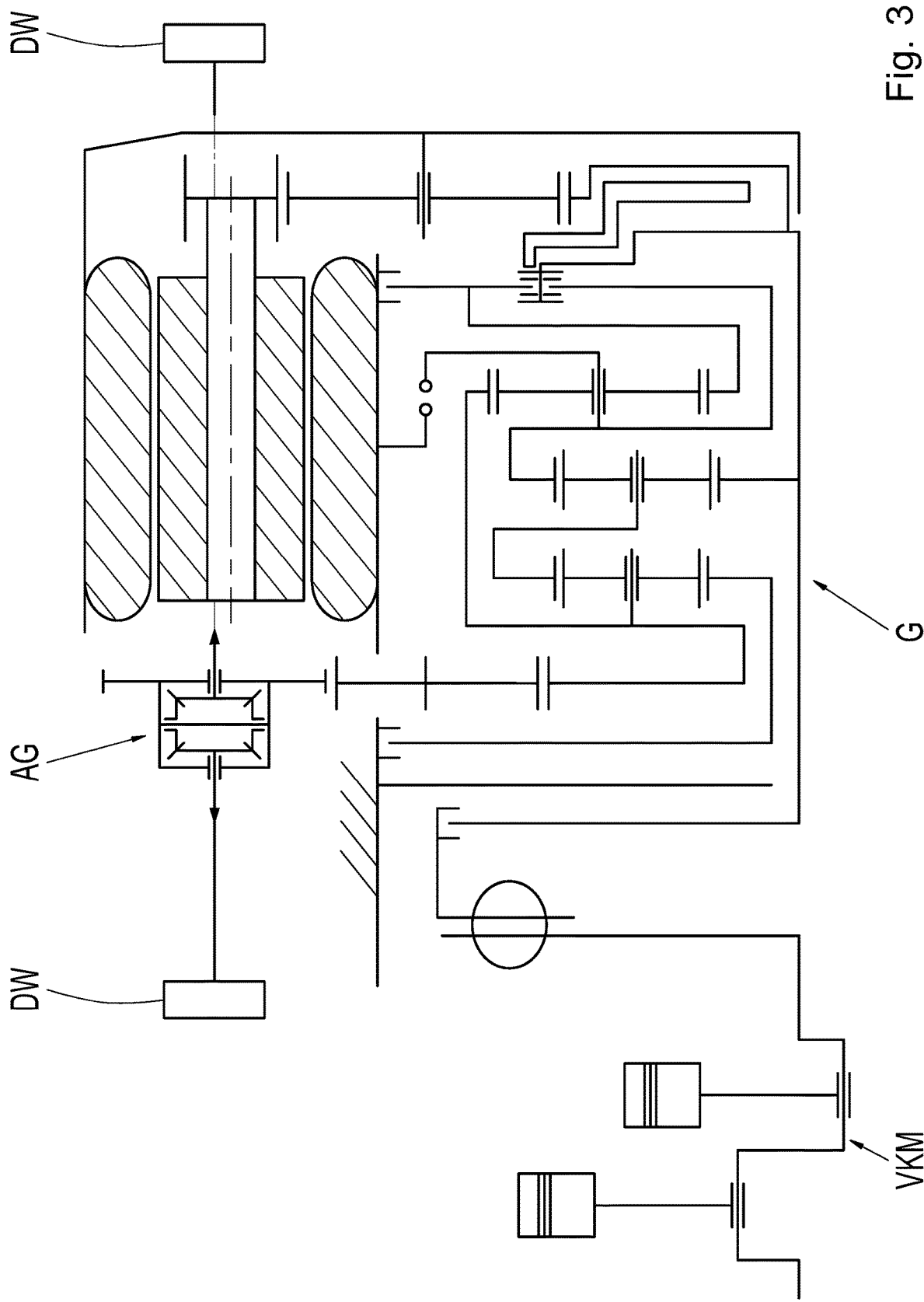
FIG. 3 shows a drive train for a motor vehicle having a transmission in accordance with aspects of the present subject matter.

FIG. 3 schematically shows a drive train of a motor vehicle having the transmission G. An internal combustion engine VKM is connected via the torsional vibration damper TS to the connecting shaft AN of the transmission G. Alternatively, the internal combustion engine VKM could be connected via the torsional vibration damper TS directly to the input shaft GW1 of the transmission G. The drive train could even contain a hydrodynamic torque converter arranged in the power flow between the internal combustion engine VKM and the input shaft GW1 of the transmission G. Such a torque converter can even include a direct drive clutch. A person skilled in the art will freely configure the arrangement and the spatial position of the individual components of the drive train depending on the external peripheral conditions. The output shaft GW2 is operatively connected to a differential gear AG, via which the power present at the output shaft GW2 is distributed to driving wheels DW of the motor vehicle.

Modifications and variations can be made to the embodiments illustrated or described herein without departing from the scope and spirit of the invention as set forth in the appended claims.

REFERENCE CHARACTERS

G transmission
GG housing
GW1 input shaft
GW2 output shaft
EM electric machine
P1 first planetary gear set
P2 second planetary gear set
P3 third planetary gear set
A first shift element
B second shift element C third shift element
D fourth shift element
E fifth shift element
BK actuating element
STG spur gear drive
STG1 element of the spur gear drive
E1 plane
GA interface
K0 separating clutch
TS torsional vibration damper
AN connecting shaft
VKM internal combustion engine
AG differential gear
DW driving wheel

The invention claimed is:

1. A transmission (G) for a motor vehicle, comprising:
an input shaft (GW1);
an output shaft (GW2);
a plurality of planetary gear sets (P1, P2, P3);
a plurality of shift elements (A, B, C, D, E); and
an electric machine (EM) arranged axially parallel to the input shaft (GW1) and operatively connected to the input shaft (GW1) with a constant transmission ratio via a spur gear drive (STG) or a flexible traction drive mechanism,
wherein various gear ratios are formable between the input shaft (GW1) and the output shaft (GW2) through the planetary gear sets (P1, P2, P3) by selectively engaging shift elements of the plurality of shift elements (A, B, C, D, E),
wherein an actuating element (BK) of one of the plurality of shift elements (B) is arranged, at least partially, radially within an element (STG1) of the spur gear drive (STG) or the flexible traction drive mechanism arranged coaxially to the input shaft (GW1), and together with the spur gear drive (STG) or the flexible traction drive mechanism in a plane (E1) is oriented at a right angle with respect to an axis of rotation of the input shaft (GW1).

2. The transmission (G) of claim 1, wherein the actuating element (BK) is a hydraulically operated piston.

3. The transmission (G) of claim 2, wherein a supply of hydraulic fluid for pressurizing the piston and a supply of hydraulic fluid for lubricating the spur gear drive (STG) or the flexible traction drive mechanism are supplied via separate ducts which are arranged, partially, within the input shaft (GW1).

4. The transmission (G) of claim 1, further comprising an interface (GA) to a transmission-external drive unit at one end of the transmission (G), the interface (GA) transmitting a turning motion of the transmission-external drive unit to the input shaft (GW1), wherein the spur gear drive (STG) or the flexible traction drive mechanism is arranged at an end of the transmission (G) positioned opposite the interface (GA) to the transmission-external drive unit.

5. A drive train for a motor vehicle, comprising the transmission (G) of claim 1.

* * * * *